United States Patent [19]

Crossley

[11] 4,393,028

[45] Jul. 12, 1983

[54] METHOD OF REMOVING URANIUM FROM A SLURRY CONTAINING MOLYBDENUM

[75] Inventor: Thomas J. Crossley, Littleton, Colo.

[73] Assignee: Wyoming Mineral Corporation, Lakewood, Colo.

[21] Appl. No.: 273,175

[22] Filed: Jun. 12, 1981

[51] Int. Cl.³ .............................................. C01G 43/00
[52] U.S. Cl. ...................................... 423/15; 423/58; 423/61
[58] Field of Search .............................. 423/15, 58, 61

[56] References Cited

U.S. PATENT DOCUMENTS

| | | | |
|---|---|---|---|
| 2,950,951 | 8/1960 | Sherk | 423/15 |
| 3,097,919 | 7/1963 | Hays et al. | 423/15 |
| 3,288,570 | 11/1966 | Henrickson | 423/58 |
| 4,092,399 | 5/1978 | Narayan et al. | 423/15 |

Primary Examiner—Herbert T. Carter
Attorney, Agent, or Firm—R. D. Fuerle

[57] ABSTRACT

Disclosed is a method of removing uranium from a slurry containing a water-insoluble molybdate and a Group II element, usually calcium. The pH of the slurry is raised with an alkali metal hydroxide and maintained at a level sufficiently high to solubilize insoluble molybdenum compounds. This will generally require a pH of at least 10 which can be achieved by adding sodium hydroxide. Carbonate ion is then added to the slurry in an amount at least sufficient to precipitate the cation of the insoluble molybdenum compound. And finally, the solid portion of a slurry, which now contains calcium carbonate and sodium uranate, is separated from the liquid portion, which contains a soluble molybdenum compound.

6 Claims, No Drawings

METHOD OF REMOVING URANIUM FROM A SLURRY CONTAINING MOLYBDENUM

BACKGROUND OF THE INVENTION

In the production of uranium by the solution mining of certain ore bodies, molybdenum is often coextracted and must be removed from the uranium stream before the uranium is precipitated from the solution. The normal procedure for removing molybdenum from the uranium solution is to absorb the molybdenum on activated carbon. The molybdenum is then removed from the carbon with ammonium hydroxide to form a dilute solution of ammonium molybdate. Because of sensitive control problems, the molybdenum solution from the carbon columns often contains uranium above the allowable limit. A typical procedure is to concentrate the molybdenum uranium mixture by precipitating both elements with calcium chloride, forming an insoluble molybdenum-uranium mixture. Until now there was no procedure for removing the uranium from this precipitated mixture and the practice was to dispose of the material at a permissible disposal site such as a deep well or a low level radioactive waste burial site.

SUMMARY OF THE INVENTION

I have discovered a method of separating and recovering uranium and molybdenum from a slurry of a water-insoluble molybdate. By reducing the uranium content in the soluble product to less than 40 ppm, the process of this invention eliminates the high cost of disposing of uranium contaminated molybdenum.

DESCRIPTION OF THE INVENTION

The material which is the subject of this invention is molybdenum which is contaminated with uranium. The molybdenum is in the form of an insoluble molybdate in an aqueous slurry which contains a Group II element, usually mostly calcium, and typically about 0.1 to about 0.6% (all percentages herein are by weight) of uranium, calculated as $U_3O_8$. The molybdenum compound typically constitutes about 40 to about 60% of the slurry. If the molybdenum content is higher, dilution with water may be necessary to facilitate good mixing. Lower molybdenum contents are to be avoided as they entail too much material handling. The insoluble molybdenum compound in the slurry is formed when calcium chloride is added to a solution of an ammonium molybdate, which precipitates calcium molybdate according to equation

The uranium, which also precipitates with the calcium molybdate, is probably some form of calcium uranate.

The first step in the process of this invention is to solubilize the molybdenum. This is accomplished by raising the pH and by adding carbonate ion to the slurry. The effect of adding carbonate ion at a high pH is to precipitate the calcium as calcium carbonate, thus preventing it from tying up the molybdenum as insoluble calcium molybdate, and instead forming a soluble molybdate such as sodium molybdate. A typical reaction is the conversion of insoluble calcium molybdate to soluble sodium molybdate according to the equation:

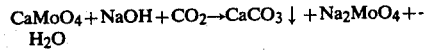

The pH must generally be maintained at greater than about 10 in order to accomplish this and preferably the pH is raised and maintained above about 12. The pH should be raised with an alkali metal hydroxide such as sodium or potassium hydroxide, in order to provide a cation for the precipitation of uranium, which precipitates as an alkali metal uranate (such as sodium diuranate) or as a calcium uranate. The alkali metal hydroxide is conveniently added as a 25 to 50% by weight solution. It may be necessary to also add some additional water to dilute the slurry sufficiently to carry out the metathesis reaction.

The carbonate ion may be added as any alkali metal or ammonium carbonate or bicarbonate or as carbon dioxide gas. Preferably, it is added as carbon dioxide gas or sodium carbonate as these are the least expensive compounds. The amount of carbonate ion present should be at least stoichiometric with the amount of calcium present in order to precipitate all the calcium, and it is preferable to use up to about 50% excess carbonate to insure that all the calcium is precipitated.

As a result of these reactions the insoluble solid portion of the slurry will now contain only calcium carbonate and an alkali metal or calcium uranate while the molybdenum compound will be in solution as a soluble molybdate. The solid can then be separated from the solution by any convenient means such as filtration, centrifugation, or settling. Filtration is generally preferred as it is the least expensive. The molybdenum in the solution can be sold as is for subsequent reduction to molybdenum oxide which is used in making stainless steel. The uranium in the solid portion of the slurry can be discarded or can be recovered by acidification and ion exchange or other suitable method. The following example further illustrates this invention.

EXAMPLE

A sample was obtained in 100 ml. of a calcium molybdate slurry which contained 59% solids, 21% of which was molybdenum and 9.5% of which was $U_3O_8$. The slurry was diluted with 50 ml. of water and 30 ml. of a 50% sodium hydroxide solution (containing roughly 15 grams of solid sodium hydroxide was added). Carbon dioxide was added to the slurry until the pH was lowered to 12.2. After two hours the slurry was filtered and the solution was analyzed and was found to contain 70 to 100 g/l of molybdenum and 40 to 200 ppm of $U_3O_8$. The residue from the above filtration was washed with approximately 100 ml. of 50 g/l in sodium carbonate. The wash was then analyzed and found to contain 30 to 50 g/l of molybdenum and 200 to 500 ppm of $U_3O_8$. The results of this experiment indicate that between 90 and 100% of the molybdenum could be recovered from the calcium molybdate slurry material using the process of this invention.

What is claimed is:

1. A method of separating uranium from molybdenum contaminated with said uranium comprising:
    (1) preparing an aqueous slurry of said uranium contaminated molybdenum which comprises calcium, about 40 to about 60% of a water-insoluble molybdate, and about 0.1 to about 0.6% uranium calculated as $U_3O_8$;
    (2) raising and maintaining the pH of said slurry about 10 with an alkali metal hydroxide;

(3) adding sufficient carbonate ion to said slurry to precipitate calcium carbonate and calcium uranate; and
(4) separating said precipitated calcium carbonate and calcium uranate from the liquid portion of said slurry, which contains said molybdenum.

2. A method according to claim 1 wherein the source of said carbonate ion is carbon dioxide.

3. A method according to claim 1 wherein the source of said carbonate ion is sodium carbonate.

4. A method according to claim 1 wherein said alkali metal hydroxide is sodium hydroxide.

5. A method according to claim 1 wherein said pH is raised above 12.

6. A method according to claim 1 wherein said water-insoluble molybdate is calcium molybdate.

* * * * *